(12) United States Patent
Otani

(10) Patent No.: US 6,394,463 B1
(45) Date of Patent: May 28, 2002

(54) OIL SEAL

(75) Inventor: Takeo Otani, Fukushima (JP)

(73) Assignee: Freudenberg-Nok General Partnership, Plymouth, MI (US)

( * ) Notice: Subject to any disclaimer, the term of this patent is extended or adjusted under 35 U.S.C. 154(b) by 44 days.

(21) Appl. No.: 09/702,119

(22) Filed: Oct. 30, 2000

(30) Foreign Application Priority Data

Mar. 14, 2000 (JP) .......................................... 2000-69889

(51) Int. Cl.$^7$ .............................. F02F 11/00; F02N 3/00
(52) U.S. Cl. ........................ 277/502; 277/503; 277/509; 123/90.37; 123/188.6
(58) Field of Search ................................ 277/500, 502, 277/503, 509, 909; 123/90.37, 188.6, 188.9; 251/214

(56) References Cited

U.S. PATENT DOCUMENTS

| | | | | |
|---|---|---|---|---|
| 3,601,420 A | * | 8/1971 | Binford .................... | 123/188.6 |
| 4,125,265 A | * | 11/1978 | Grzesiak ..................... | 277/502 |
| 4,763,618 A | * | 8/1988 | Stritzke ................... | 123/188.6 |
| 4,811,704 A | * | 3/1989 | Boehmer et al. ........ | 123/188.6 |
| 4,909,202 A | * | 3/1990 | Binford et al. .......... | 123/188.6 |
| 4,915,069 A | * | 4/1990 | Lafever et al. .......... | 123/188.6 |
| 6,209,504 B1 | * | 4/2001 | Hegemier et al. ....... | 123/188.6 |
| 6,244,235 B1 | * | 6/2001 | Hegemier et al. ....... | 123/188.6 |

* cited by examiner

*Primary Examiner*—Anthony Knight
*Assistant Examiner*—Enoch Peavey

(74) *Attorney, Agent, or Firm*—A. Michael Tucker; Casimir R. Kiczek

(57) ABSTRACT

The oil seal of the present invention for a valve stem includes a triple seal lip having a cam chamber side lip, a first combustion chamber side lip and a second combustion chamber side lip. Notches are provided on the second combustion chamber side lip and other notches are provided on the first combustion chamber side lip. These notches permit flow communication from the cam chamber side with the combustion chamber side. The notches provided on the combustion chamber side lip and the notches provided on the second combustion chamber side lip are placed circumferentially shifted from each other so that the notches are not axially aligned relative to the notches. Preferably, the non-notched portion is axially aligned and spaced apart relative to the notched portion. Similarly, the notched portion is axially spaced relative to the non-notched portion, such that when the valve stem moves eccentrically toward the notch on the combustion chamber side lip, the second combustion chamber side lip prevents the eccentric motion of the valve stem. When the valve stem moves eccentrically toward the notch on the second combustion chamber side lip, the combustion chamber side lip prevents the eccentric motion of the valve stem. Therefore, when compared to a conventional oil seal for the valve stem, the eccentric movement of the valve stem can be considerably reduced and the variance in the amount of oil leaking or migrating due to the eccentric movement of the valve stem, from the cam chamber side to the combustion chamber side, can be considerably reduced. Furthermore, the eccentric movement of the valve stem is reduced compared to a conventional stem, so that the wear of the oil seal of the present invention can be considerably reduced to attain stable oil migration during operation.

20 Claims, 4 Drawing Sheets

OIL SEAL

BACKGROUND OF THE INVENTION

The present invention relates to oil seals and particularly to oil seals for sealing valve stems which are used in combustion engines.

DESCRIPTION OF THE RELATED ART

As shown in FIG. 4, an oil seal 52 is mounted on the stem portion of a valve stem 51 of a combustion engine. The oil seal controls the amount of oil between the valve stem 51 and valve stem guide 53, to prevent the valve stem 51 from initial start-up or dry wear-in (burning-in), to prevent the valve stem guide 53 from normal wear or abrasion, or to prevent a large amount of oil from migrating toward the combustion chamber.

Oil seals 52 of this kind usually have a double lip having a cam or oil chamber side lip 54 for sealing a valve stem 51 and a combustion chamber side lip 55. The combustion chamber side lip 55 acts to seal oil along the periphery of the reciprocating valve stem 51. The cam or oil chamber side lip 54 controls the amount of oil which migrates from the cam or oil chamber side toward the combustion chamber side.

With the oil seal 52 having two lips, the variance of the amount of oil that migrates in operation is comparatively small, though there is still some variance in the amount of oil that migrates during operation.

The variance in oil migration or leakage is due to several reasons. As shown in FIG. 4, a notch portion 56 is formed on the inner periphery of the combustion chamber side lip 55, to allow oil to leak from the cam chamber side lip 54. The notch portion 56 on the inner side of the combustion chamber side 55 allows the valve stem 51 to move toward the notch portion 56 so that the amount of migrating oil is not stable during operation due to the eccentric motion of the valve stem.

SUMMARY OF THE INVENTION

An object of the present invention is to provide an oil seal having a stable oil leak rate during operation by controlling the amount of eccentric movement of the valve stem.

In order to obtain the above mentioned objective, an oil seal of the present invention has a cam chamber side lip and a combustion chamber side lip. A notch is provided on the combustion chamber side lip to permit flow communication of the combustion chamber with the cam or oil chamber. A second combustion chamber side lip is provided next to the combustion chamber side lip and on the side of the combustion chamber. A second notch is provided on the second combustion chamber side lip so that oil can move from the cam or oil chamber to the combustion chamber. The notch on the combustion chamber side lip and the second notch on the second combustion chamber side lip are offset in the circumferential direction.

In the oil seal of the present invention, a second combustion chamber side lip next to the combustion chamber side lip is formed on the side of the combustion chamber side. The second combustion chamber side lip has, like the combustion chamber side lip, a notch or a plurality of notches which permit the combustion chamber to communicate with the cam or oil chamber. The notch on the combustion chamber side lip and the notch portion on the second combustion chamber side lip are offset to one another in the circumferential direction of both lips. Thus, when the valve stem tends to be disposed eccentrically relative to the notch portion of the combustion chamber side lip, the second combustion chamber side lip prevents the valve stem from tending to be eccentric. Additionally, when the valve stem tends to move eccentrically toward the notch on the second combustion chamber side lip, the combustion chamber side lip prevents the valve stem from such eccentric movement.

These and other features of the present invention will become apparent from the description of the embodiments and the drawings.

BRIEF DESCRIPTION OF THE DRAWINGS

The various advantages of the present invention will become apparent to one skilled in the art upon reading the following specification and by reference to the drawings which include.

DETAILED DESCRIPTION OF THE PREFERRED EMBODIMENT

Figure 1:
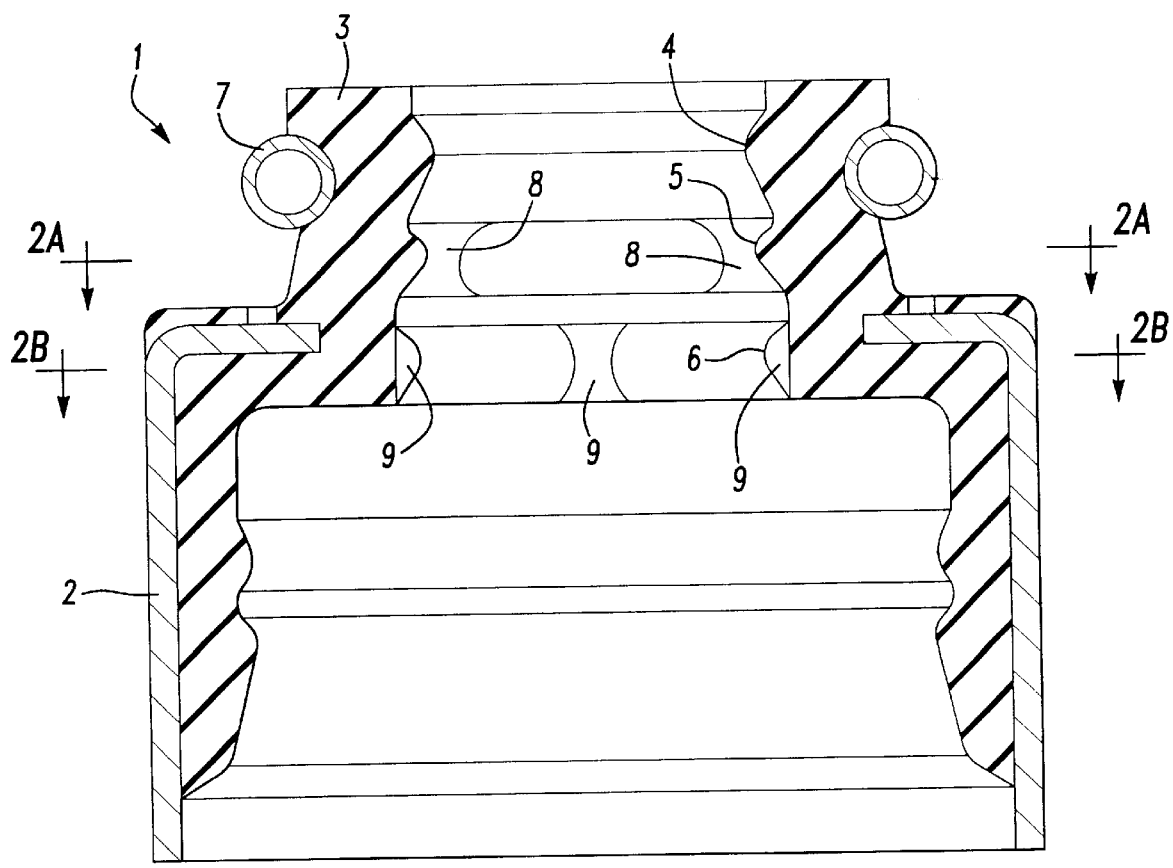
FIG. 1 is a cross sectional view of an oil seal of the present invention.

The oil seal of the present invention for a valve stem includes a seal portion 3 made of elastomeric material which is mounted fixedly on a rigid reinforcing ring or mounting ring 2. The inner section of the seal portion 3 has a triple lip which includes a cam chamber side lip or first seal lip 4, a first combustion chamber side lip or third seal lip 5 and a second combustion side lip or second lip 6. On the outer peripheral surface of the seal portion 3, a garter spring 7 is inserted in a recess.

Figure 2A:
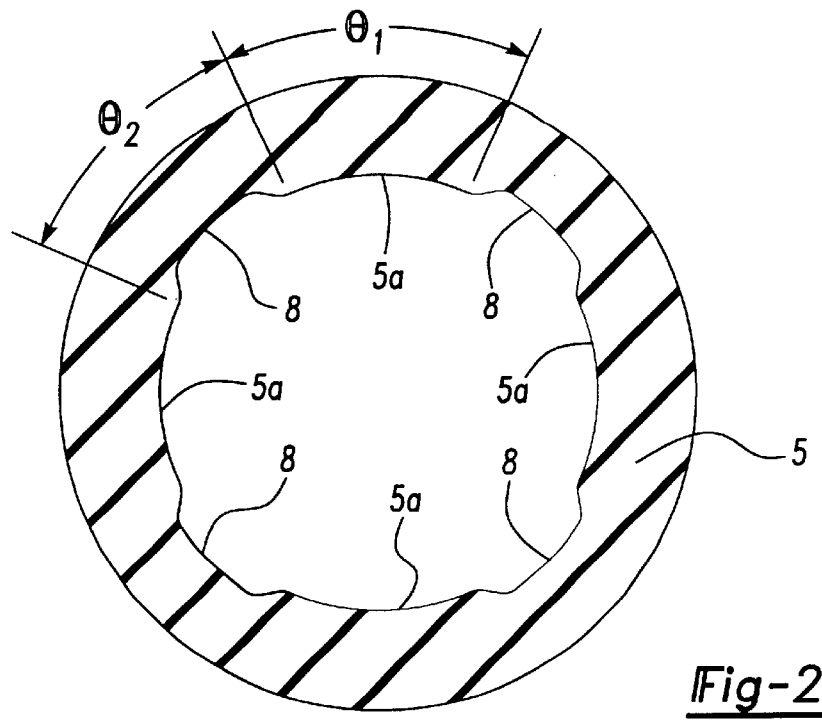
FIG. 2A is a cross sectional view along A—A in FIG. 1.
Figure 3:
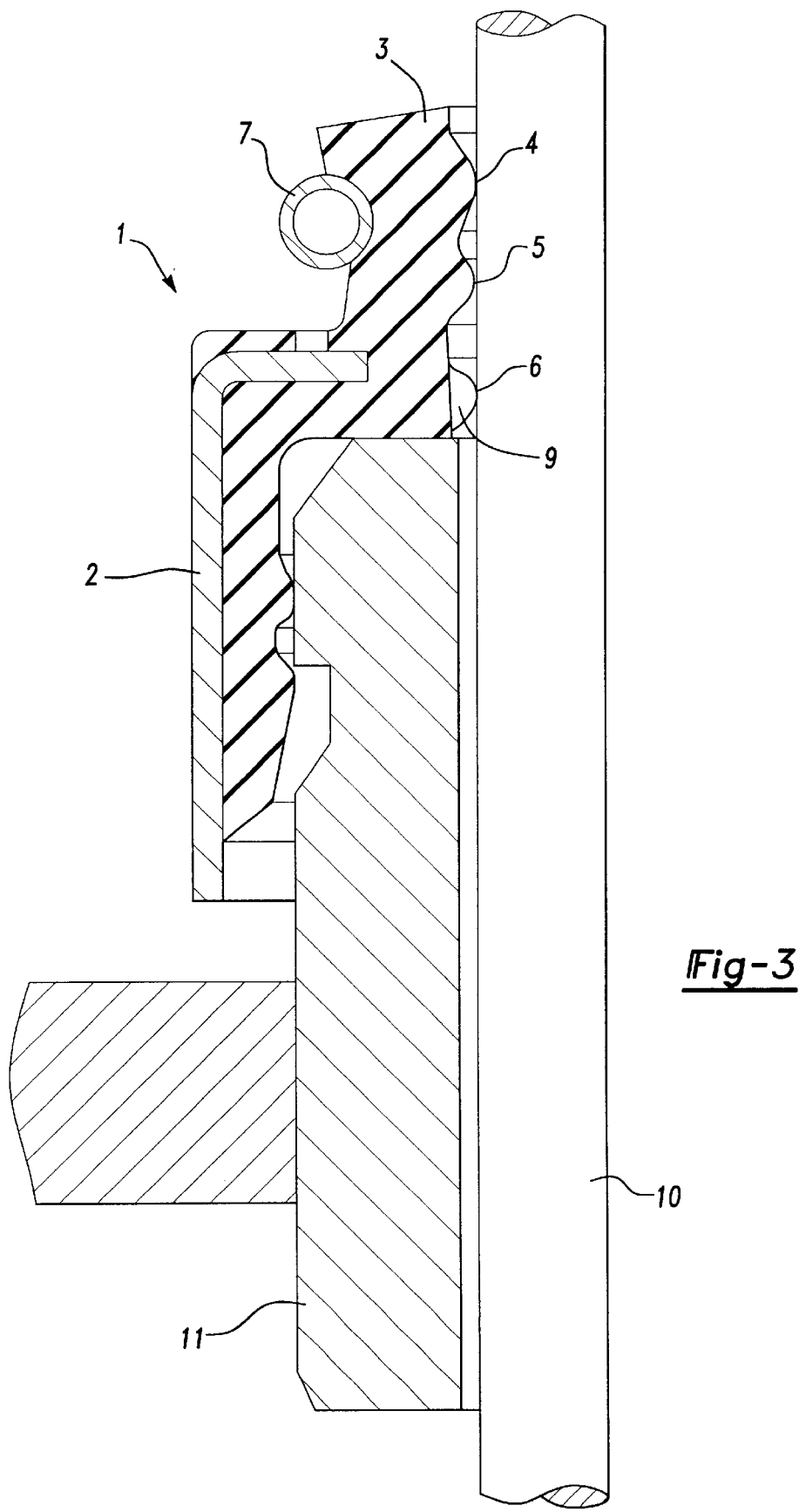
FIG. 3 is a cross sectional view of the oil seal of the present invention with the oil seal being mounted on a valve stem.
Figure 4:
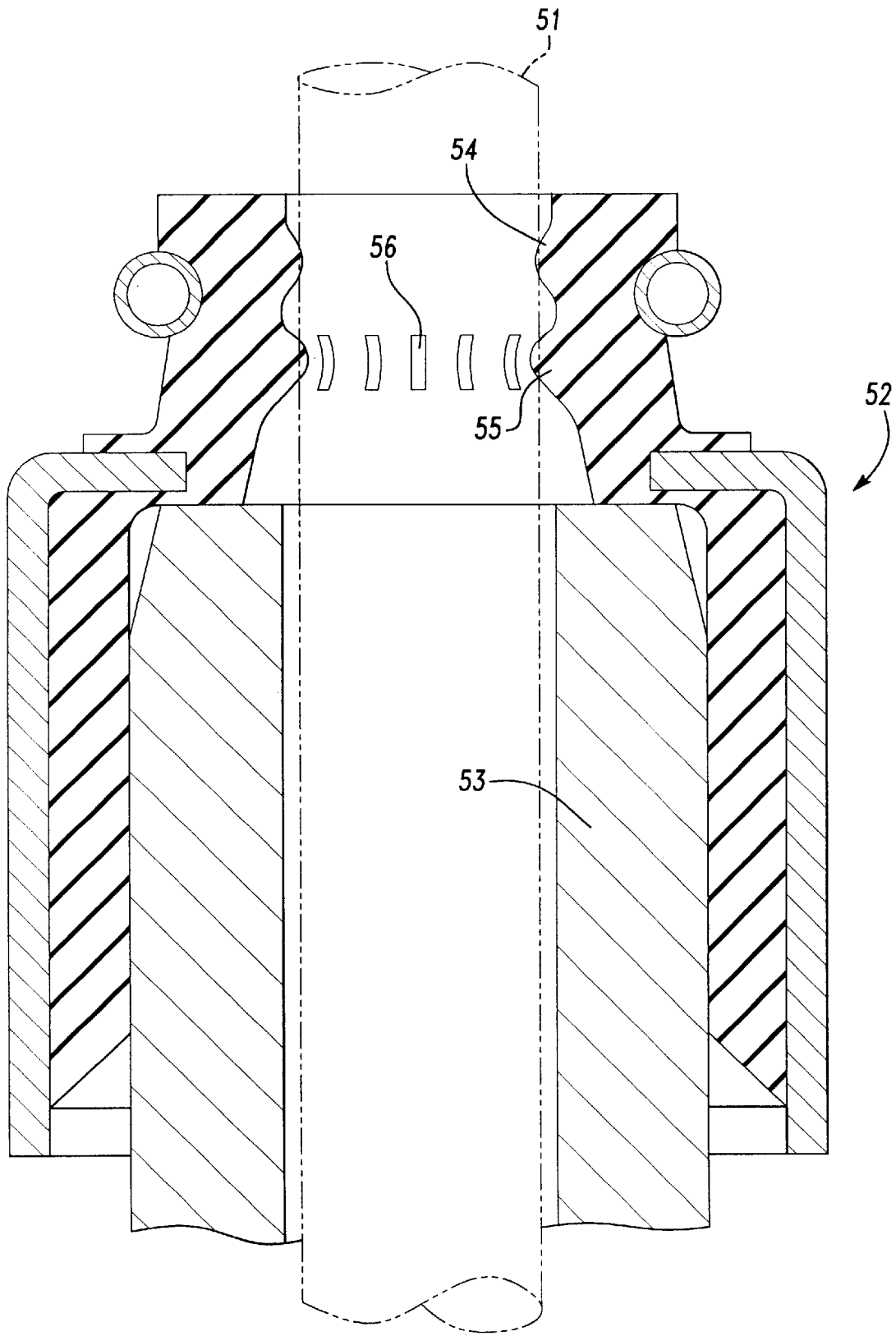
FIG. 4 is a cross sectional view of a convention an oil seal.

As is shown in FIG. 2A, on the inner peripheral or interior section of the first combustion chamber side lip 5, a plurality of notches 8 are formed allowing oil to pass through the cam chamber side lip 4. The notches 8 are equally spaced circumferentially on the lip. In FIG. 1, four notches 8 are equally spaced on the inner section of the lip. The dimensions of these notches is usually dependent on the diameter of the valve stem 10, as shown in FIG. 3. For example, if the diameter of valve stem 10 is 8 mm, the inner peripheral diameter of the first combustion chamber lip is 7.6 mm in its free state, that is when no spring 7 is mounted in the recess. The dimension of the notches is 2.65 mm in the circumferential direction. The inner section of the first combustion chamber side lip forms an angle θ1 approximately 40 degrees as is shown in FIG. 2A. The angle of θ2 of the notched portion is approximately 50 degrees. The ratio of the angle θ1 to θ2 is 4 to 5. This example is not to be taken as a limitation of the invention since the invention may have other. dimensions, characteristics, geometric relationships and forms.

Figure 2B:
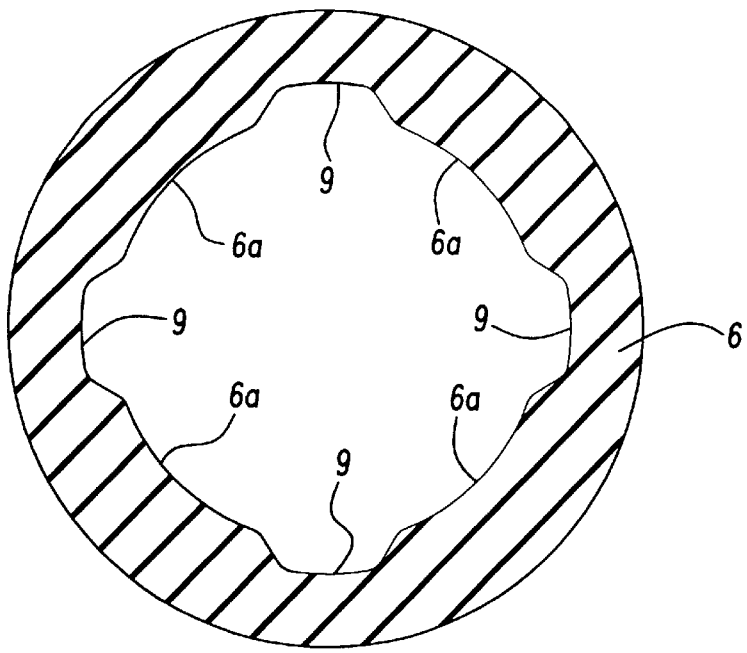
FIG. 2B is a cross sectional view along B—B in FIG. 1.

As shown in FIG. 2B, on the inner peripheral section of the second combustion chamber side lip 6, a predetermined number of notches or second notches 9 are formed. The notches 9 allow oil, which leaks or migrates from the cam or oil chamber, to flow past the second combustion chamber side lip 6 toward the combustion chamber side. The notches 9 are evenly spaced on the inner peripheral section. In FIG. 2B, four notches 9 are evenly spaced on the inner peripheral section of the second combustion chamber side lip 6.

However, both notches 8 of the first combustion chamber side lip 5 and the notches 9 of the second combustion chamber side lip 6 are shifted relative to each other in the circumferential direction of the lips. As is shown in FIGS. 2A and 2D both notches 8 and 9 are alternatively placed apart 45 degrees from each other in a circumferential direction.

As shown in FIG. 3, in the present oil seal, when the valve stem 10 tends to move eccentrically toward notches 8 on the first combustion chamber lip 5, the non-notch portions 6a of the second combustion chamber side lip 6 prevent the valve stem from such eccentric motion. On the other hand, when the valve stem 10 moves eccentrically toward the notches 9 of the second combustion chamber side lip 6, the non-notch portions 5a of the first combustion chamber side lip 5 prevent the valve stem from the eccentric motion. Thus, it is possible to effectively prevent eccentric motion of the valve stem 10 by the oil seal in a radially outside direction, as compared to a conventional oil seal of this type. Therefore, any variance of the amount of oil which leaks past each oil seal due to the eccentric motion of the valve stem is considerably reduced. Also, as the eccentric motion of the valve stem is prevented in the present invention, some wear of the cam chamber side lip 4, which occurs from the eccentric motion of the valve stem, is considerably reduced so that stable migration of oil from the cam or oil chamber can be attained.

Additionally, when the shape and size of the lip portion 6 and the notches 9 of the second combustion chamber side lip 6 are made to the same shape and size of the lip 5 and the notches 8 of the first combustion chamber side lip 5, oil migrating through the cam chamber side lip 4 from the cam chamber side toward the combustion chamber side can flow smoothly or migrate into the space between the radially outer surface of the valve stem 10 and the radially inner surface of the valve stem guide 11.

Furthermore, the dimensions of the second notches 9 of the second combustion chamber side lip 6 can be made larger than the dimensions of the first notches 8 of the first combustion chamber side lip 5 so as to reduce the sliding resistance of the second combustion chamber side lip 6. Still further, the shape of the second notches 9 can be made triangularly shaped and peaked toward the combustion chamber side, thus reducing the sliding resistance of the second combustion chamber side lip 6. Or, still further, the dimensions of the second notches 9 can be made to such a shape that the notches are comparatively small in dimension on the side facing the cam chamber side, thereby reducing the sliding resistance of the second combustion chamber side lip 6.

While the invention has been described in connection with a preferred embodiment, it will be understood that it is not intended to limit the invention to that embodiment only. On the contrary, it is intended to cover all alternative modifications and equivalents that may be included within the spirit and scope of the invention as defined by the appended claims.

What is claimed is:

1. A valve stem seal adapted for use in a combustion engine, the combustion engine having a valve stem guide and a valve stem, the valve stem guide having a bore, the valve stem reciprocally disposed in the bore, the valve stem having one end extending toward an oil chamber and the other end extending toward a combustion chamber, said valve stem seal comprising:

a rigid annular support member;

an annular elastomeric body adjacent said rigid annular support member, said annular body having an interior section, said interior section having three lips which sealingly engage the valve stem including;

a first lip;

a second lip adjacent to said first lip;

said second lip having a plurality of first notches on the circumferential inner portion of said second lip and a non-notched portion adjacent to one of said plurality of first notches; and a third lip adjacent to said second seal, said third lip having a plurality of second notches on the circumferential portion of said third lip and a second non-notched portion, said first notch in flow communication with the oil chamber and said second notch in flow communication with said first notch, said first plurality of notches are circumferentially shifted relative to said second plurality of notches in order to prevent said first notch and said second notch from being in an axially aligned condition.

2. A valve stem seal as claimed in claim 1 wherein said first notch is spaced apart from said second notch by 45 degrees in a circumferential direction.

3. A valve stem as claimed in claim 1 wherein said first non-notch portion forming a first arcuate segment, said first arcuate segment having an angle θ1, said first notch portion forming a second arcuate segment, said second arcuate segment having an angle θ2, said angle θ1 plus angle θ2 being equal to 90 degrees.

4. A valve stem as claimed in claim 2 wherein said angle θ1 is less than said angle θ2.

5. A valve stem as claimed in claim 2 wherein said angle θ1 is 40 degrees and said angle θ2 is 50 degrees.

6. A valve stem as claimed in claim 2 wherein said first notch portion is staggered axially relative to said second notch portion.

7. A valve stem as claimed in claim 2 wherein said first notch and said second notch are alternatively axially spaced apart 45 degrees.

8. A valve stem as claimed in claim 7 wherein said first notch and said second notch prevent the valve stem from moving eccentrically.

9. A valve stem as claimed in claim 7 wherein when the valve stem tends to move eccentrically in the bore toward said first notches, said first non-notched portion prevents the valve stem from such eccentric motion in the bore.

10. A valve stem as claimed in claim 7 wherein when the valve stem tends to move eccentrically in the bore toward said second notch, said second non-notch portion preventing the valve stem from said eccentric motion in the bore.

11. A valve stem seal as claimed in claim 2 wherein said first notch is spaced apart from said second notch to permit a slight migration of oil from the oil chamber toward the combustion chamber.

12. A valve stem seal adapted for use in a combustion engine, the combustion engine having a valve stem guide with a bore and a valve stem disposed in said bore, said valve stem having one end extending toward an oil chamber and another end extending toward a combustion chamber, said valve stem comprising:

a rigid annular support member;

an elastomeric body adjacent said rigid support member, said elastomeric body having an internal section and an external section, said external section having a recess, said internal section having three seal lips, said three seal lips including;

a seal lip;

an intermediate seal lip adjacent to said seal lip; and another seal lip adjacent to said intermediate seal lip, said intermediate seal lip having a first notch on the circumferential portion of said intermediate seal lip, said another seal lip having a second notch on the circumferential portion of said another seal lip; said notch in flow communication with the oil chamber, said second notch in flow communication with said first notch, said first notch being radially offset from said second notch so that when the valve stem being prone to being eccentric relative to the intermediate seal lip, said another seal lip prevents the valve stem from being eccentric in the bore; and a garter spring in said recess.

13. A valve stem seal as claimed in claim 12 wherein said intermediate seal lip having a first non-notch on said circumferential portion adjacent said first notch, said first non-notch forming an angle θ1 and said first notch forming an angle θ2, said angle θ1 plus said angle θ2 equal 90 degrees.

14. A valve stem seal as claimed in claim 12 wherein and intermediate seal lip further having another first notch and another first non-notch.

15. A valve stem seal as claimed in claim 12 wherein said intermediate lip and said another lip seal having an equal number of notches.

16. A valve stem seal as claimed in claim 13 wherein said first notch and said first non-notch forming a first arcuate segment, said intermediate seal lip having four arcuate segments.

17. A valve stem seal as claimed in claim 13 wherein said second notch and said second non-notch forming a second arcuate segment, said another seal lip having four arcuate segments.

18. A valve stem seal as claimed in claim 13 wherein said first notch is staggered circumferentially relative to said second notch to stabilize the migration of oil from the oil chamber to the combination chamber.

19. A valve stem seal as claimed in claim 13 wherein the circumferential length of said first notch is less than the circumferential length of said second notch to reduce the sliding resistance of said another lip on the valve stem.

20. A valve stem seal as claimed in claim 13 wherein said another seal lip having a shape, said shape being triangular to reduce the sliding resistance of said another seal lip on the valve stem.

* * * * *